US008027680B2

(12) United States Patent
Thalanany et al.

(10) Patent No.: US 8,027,680 B2
(45) Date of Patent: Sep. 27, 2011

(54) SELECTIVE HANDOFF BETWEEN ACCESS GATEWAYS

(75) Inventors: Sebastian Thalanany, Buffalo Grove, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1349 days.

(21) Appl. No.: 11/324,059

(22) Filed: Dec. 30, 2005

(65) Prior Publication Data

US 2007/0160072 A1    Jul. 12, 2007

(51) Int. Cl.
*H04W 36/00* (2009.01)
(52) U.S. Cl. ........................................ 455/436; 370/331
(58) Field of Classification Search .................. 455/450, 455/436, 439, 442
See application file for complete search history.

(56) References Cited

U.S. PATENT DOCUMENTS

| | | | |
|---|---|---|---|
| 7,031,709 B2 | 4/2006 | Watanabe et al. | |
| 2002/0087674 A1 | 7/2002 | Guilford et al. | |
| 2003/0125028 A1* | 7/2003 | Reynolds | 455/437 |
| 2004/0218607 A1* | 11/2004 | Hurtta et al. | 370/395.21 |
| 2004/0223489 A1* | 11/2004 | Rotsten et al. | 370/352 |
| 2004/0246922 A1* | 12/2004 | Ruan et al. | 370/331 |
| 2005/0128956 A1 | 6/2005 | Hsu et al. | |
| 2005/0135310 A1 | 6/2005 | Cromer et al. | |
| 2005/0136928 A1* | 6/2005 | Zaki | 455/436 |
| 2006/0019659 A1 | 1/2006 | Rosenberg et al. | |
| 2006/0084417 A1 | 4/2006 | Melpignano et al. | |
| 2006/0245392 A1 | 11/2006 | Buckley et al. | |
| 2006/0291419 A1* | 12/2006 | McConnell et al. | 370/331 |
| 2008/0159232 A1 | 7/2008 | Thalanany et al. | |

OTHER PUBLICATIONS

3RD Generation Partnership Project 2 (3GPP2), "All-IP Network Architecture Model for cdma2000 Spread Spectrum Systems,", S.R0037-0 v3.0, Sep. 2003.
J. Rosenberg, H. Schulzrinne, G. Camarillo, A. Johnson, J. Peterson, R. Sparks, M. Handley, E. Schooler, "SIP: Session Initiation Protocol," RFC 3261, IETF, Jun. 2002.
Handley, M. and V. Jacobson, "SDP: Sesison Description Protocol," RFC 2327, Apr. 1998.
Camarillo, G., W. Marshall, and J. Rosenberg, "Integration of Resource Management and Session Initiation Protocol (SIP)," RFC 3312, Oct. 2002.
Office Action for U.S. Appl. No. 11/618,534 (U.S. App. Pub. No. 2008/0159232) dated Nov. 10, 2009.

(Continued)

*Primary Examiner* — Nick Corsaro
*Assistant Examiner* — Marcos Batista
(74) *Attorney, Agent, or Firm* — Leydig Voit & Mayer, Ltd.

(57) ABSTRACT

Embodiments of the invention include providing access by a user device of a network service including: sending an initiation signal to a SIP proxy server, initiating an application on the user device, sending QoS parameters for the user device and the application to a policy function server, sending a resource allocation request to a first access gateway, providing the network service in accordance with the QoS parameters, if the first access gateway can no longer provide the network service in accordance with the QoS parameters, determining a second access gateway that can provide the network service according to the QoS parameters, providing the network service to the user device via a link between the first and second access gateways, providing the network service to the user device via the second access gateway when communication between the user device and the second access gateway has been established; and closing the link.

10 Claims, 5 Drawing Sheets

OTHER PUBLICATIONS

Reply to Office Action of Nov. 10, 2009 for U.S. Appl. No. 11/618,534 (U.S. App. Pub. No. 2008/0159232).
Granstrom et al. "The Future of Communication Using SIP," *Ericsson Review No. 1* (2002) (8 pages).
Gustafson, Network Design with Mobile IP, Internet Society inet2001 Proceedings, obtained from the internet at htto://fto.isoc.orci/inet2001/CD Droceedinas/T40/inet T40.htm on Dec. 4, 2006 (23 pages).
Kavak, "Ericsson's Network-Based IP-VPN Solutions," Ericsson Review No. 3 (2000) (14 pages).
Kasargod et al. "Packet Data in the Ericsson CDMA2000 Radio Access Network," Ericsson Review No. 3 (2002) (8 pages).
Garcia-Martin et al., "Private Header (P-Header) Extensions to the Session Initiation Protocol (SIP) for the 3 rd-Generation Partnership Project (3GPP)," The Internet Society, RFC 3455 (Jan. 2003) (34 pages).
3RD Generation Partnership Project 2, "All-IP Core Network Multimedia Domain," 3GPP2 X .S0013=002-A v1.0 (Nov. 2005) (179 pages).
Gohring, "Nokia Simplifies Dual-Mode Phones," IDG News Service (Oct. 31, 2006), obtained from the Internet at http://www.pcworld.com/article/id,127713-page,1-c,cellphones/article.html (3 pages).
Office Action for U.S. Appl. No. 11/618,534 (U.S. Publication No. 2008/0159232) dated May 11, 2010.
Request for Continued Examination (RCE) and Reply to Office Action filed Aug. 11, 2010 in response to Final Office Action dated May 11, 2010 in U.S. Appl. No. 11/618,534 (U.S. Publication No. 2008/0159232).
Non-Final Office Action for U.S. Appl. No. 11/618,534 (U.S. Publication No. 2008/0159232) dated Mar. 16, 2011.
Reply to Office Action filed Jun. 16, 2011 in response to Non-Final Office Action dated Mar. 16, 2011 in U.S. Appl. No. 11/618,534 (U.S. Publication No. 2008/0159232).

* cited by examiner

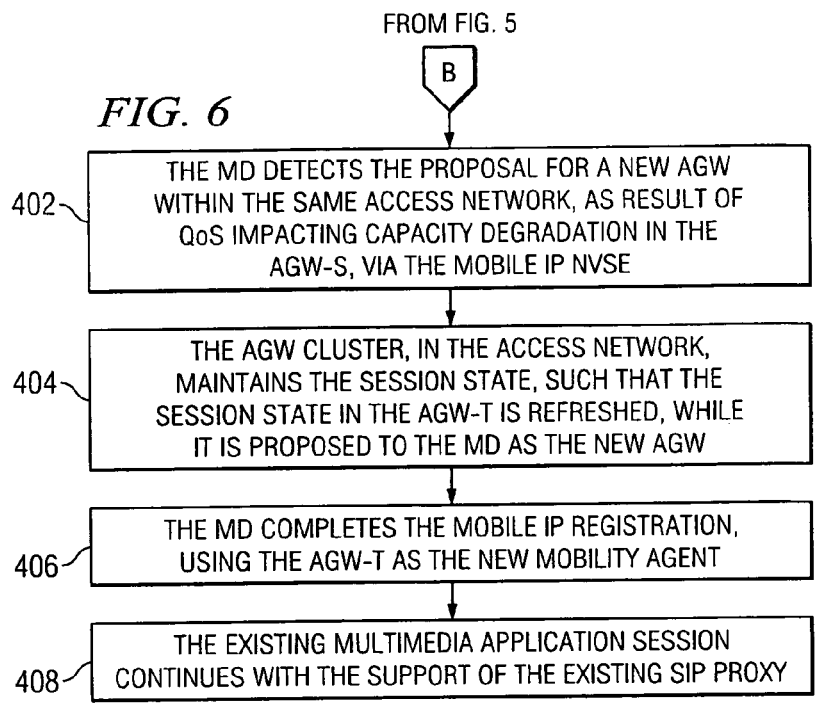
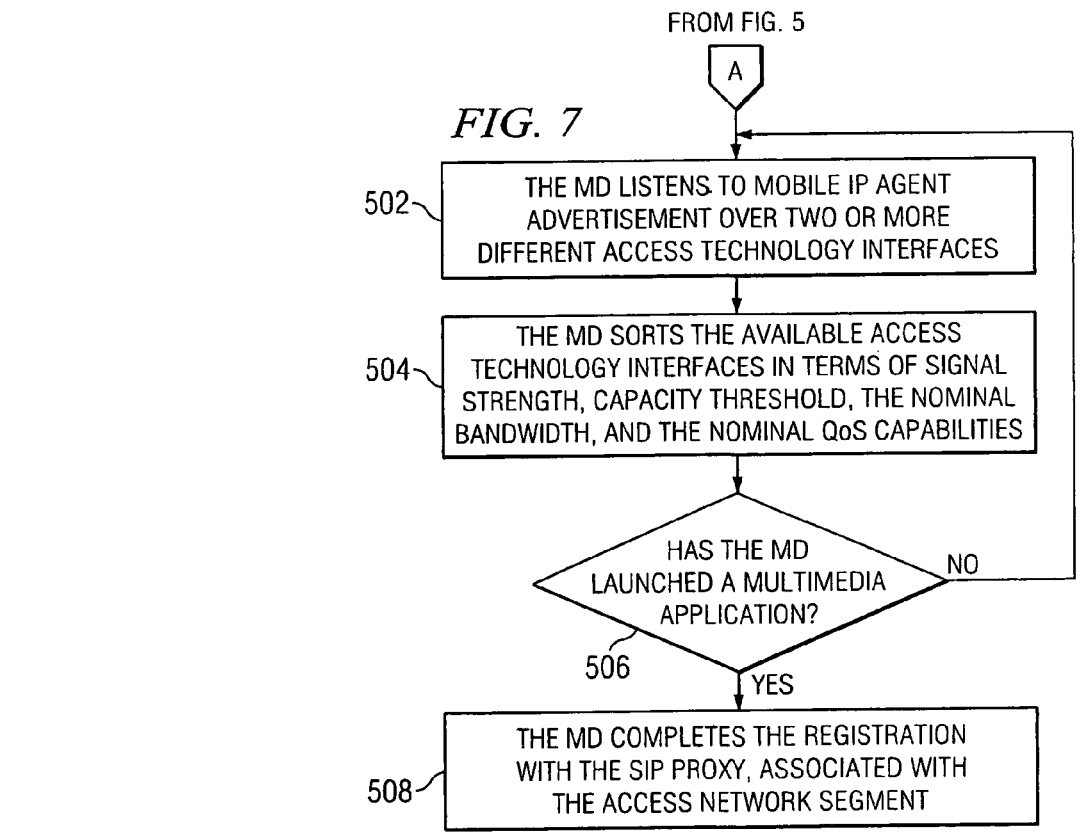

SELECTIVE HANDOFF BETWEEN ACCESS GATEWAYS

FIELD OF THE INVENTION

The present invention relates to the access gateway control in mobile networks. More specifically, the present invention relates to network support for selective handoff of a mobile device based on capacity and the application QoS (Quality of Service) constraints.

BACKGROUND OF THE INVENTION

Mobile devices capable of using many wireless access protocols are currently entering the marketplace. Phones will soon be available that can access multimedia services, such as streaming video, by either a third generation cellular network or a Wi-Fi network based on the IEEE 802.11 series of standards. FIG. 1 shows this graphically. Mobile device 10 uses the cellular radio network 12 to access a multimedia application 14. Alternatively, mobile device 20 can use another wireless network 22, such as a Wi-Fi network to access the multimedia application 14 via the Internet 24. Typically, these mobile devices are programmed to select the network used based on availability and a preference setting. For example, a multi-protocol phone may be programmed to select a Wi-Fi network when available and the cellular network when no Wi-Fi connection is available.

In a third-generation wireless access network, the radio network is connected to an access gateway, which serves a mobile device. The access gateway performs the mobility agent function to support the network layer mobility of the mobile device. The handoff of the mobile device is typically triggered by the mobility of the mobile device across the serving areas of different access gateways.

In the existing mobile packet data systems, the schemes for a handoff of a mobile device across access gateways have several limitations. These limitations include a lack of preservation of quality of service (QoS) constraints as dictated by an application in the presence of mobility. Particularly with regard to video streaming connections, QoS requires a sufficient available capacity for data transfer to avoid visible interruptions or degradations. The preservation of QoS constraints is required in the case of network layer mobility in the case of intra-access technology mobility as well as in the case of inter-access technology mobility. Intra-access technology mobility is transfer of service from one gateway to another using the same technology, such as a cellular network. Inter-access technology mobility is transfer between technologies, such as switching between cellular technologies and a Wi-Fi domain.

In the case of intra-access technology mobility, the degradation of QoS is likely to occur in cases where the capacity thresholds associated with the serving access gateway are exceeded or if impending fault conditions result in capacity limitations. In the case of inter-access technology mobility, the degradation of QoS is likely to occur in cases, where an appropriate access technology is not selected from among multiple available access technologies. The adverse impact of a degradation of QoS translates into latencies, especially in the case of a VoIP (Voice-over-IP) service and other delay sensitive multimedia services.

In next-generation access networks, multiple wireless access technologies are available for the mobile device for attachment to an access gateway. For a hybrid mobile device, multiple access gateways using a variety of technologies may be available in any particular geographic location. The present invention is directed to the problem of providing seamless transfers between these gateways while maintaining the connection's QoS.

SUMMARY OF THE INVENTION

The described embodiments of the present invention include a method for providing access by a user device of a network service including: sending an initiation signal from the user device to a session initialization proxy server, initiating an application on the user device that requires the network service, sending quality of service parameters for the user device and the application from the session initialization proxy server to a policy function server, sending a resource allocation request from the policy function server to a first access gateway, in response to the resource allocation request, providing the network service to the user device in accordance with the quality of service parameters via the first access gateway, monitoring the first access gateway to determine if the first access gateway can continue to provide the network service in accordance with the quality of service parameters, if the first access gateway can no longer provide the network service in accordance with the quality of service parameters, determining a second access gateway that can provide the network service according to the quality of service parameters, providing the network service to the user device via a link between the first access gateway and the second access gateway, establishing communication between the second access gateway and the user device, providing the network service to the user device via the second access gateway when communication between the user device and the second access gateway has been established; and closing the link between the first access gateway and the second access gateway.

In another embodiment, a method for initiating an application on a device includes monitoring a plurality of access networks on which the application is available, determining one or more quality of service parameters on each of the access networks, ranking each of the access networks according to the quality of service parameters, and initiating the application on the highest ranking one of the plurality of access networks.

SUMMARY OF THE DRAWINGS

The descriptions of the embodiments herein can be better understood in light of the drawings, wherein:

FIG. 6 is a flow diagram of a subprocess of the process shown in FIG. 5; and

FIG. 7 is a flow diagram of a modification of the process of FIG. 5, which is another embodiment of the present invention.

DETAILED DESCRIPTION OF THE INVENTION

Figure 1:
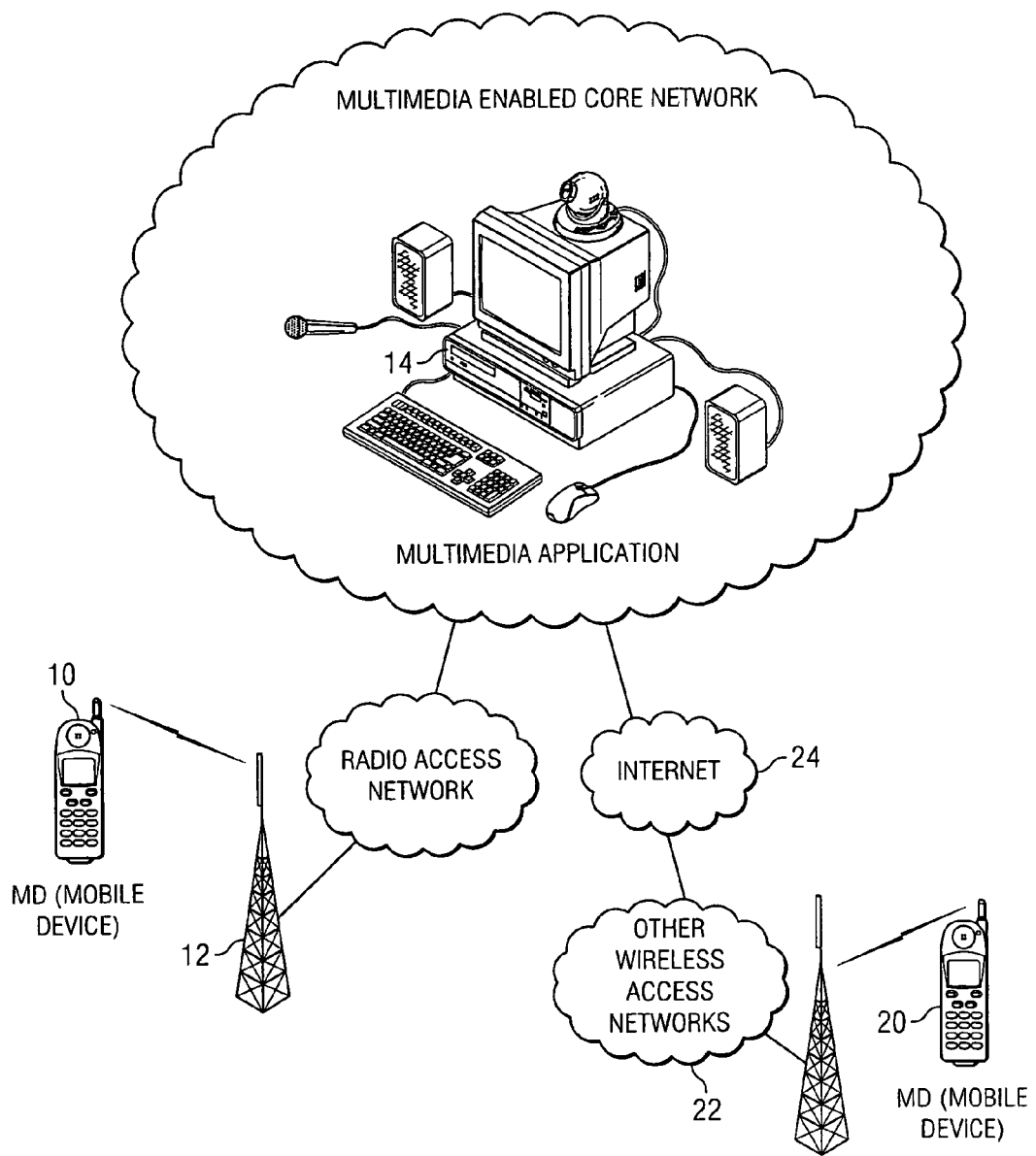
FIG. 1 is a schematic diagram showing two access networks capable of accessing a multimedia application.
Figure 2:
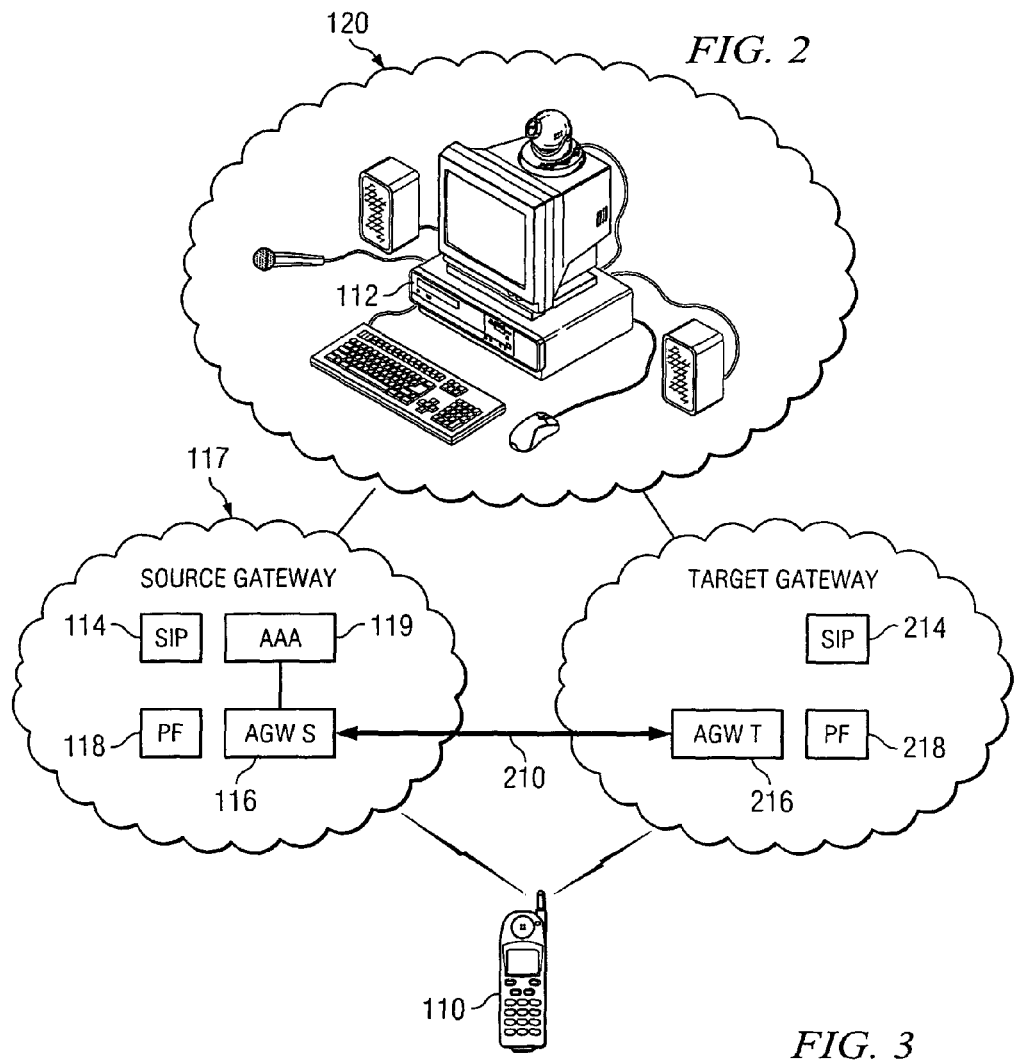
FIG. 2 is a schematic diagram showing the operation of one embodiment of the present invention.
Figure 3:
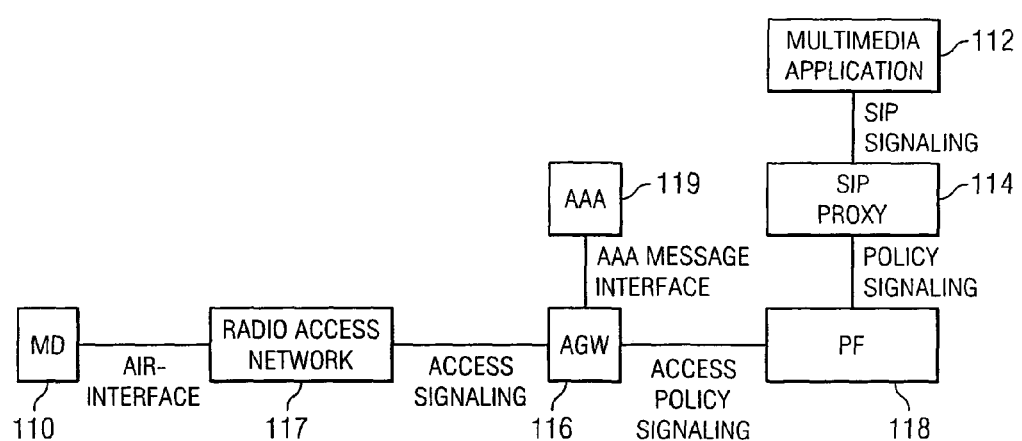
FIG. 3 is a diagram illustrating the connections between the components of FIG. 2.

FIG. 2 shows a schematic diagram of a mobile device 110 accessing a media service on media server 112. This embodiment of the invention is particularly applicable to accessing streaming media, but is capable of addressing any type of data communication where QoS should be maintained. The mobile device 110 initiates a media session by sending a call to Session Initiation Protocol (SIP) proxy 114 (see J. Rosenberg, H. Schulzrinne, G. Camarillo, A. Johnston, J. Peterson, R. Sparks, M. Handley, E. Schooler, "SIP: Session Initiation Protocol," RFC3261, IETF, June 2002; and see Camarillo, G., Marshall, W., and J. Rosenberg, "Integration of Resource Management and Session Initiation Protocol (SIP)", RFC 3312, October 2002, which are both incorporated herein by reference) via Access GateWay (AGW) 116 using a radio access network 117. The user is authenticated for the service using the authentication, authorization, and accounting (AAA) server 119. The core network 120 contains the IMS (IP Multimedia Subsystem) framework entities. These connections are shown schematically in FIG. 3.

Figure 4:
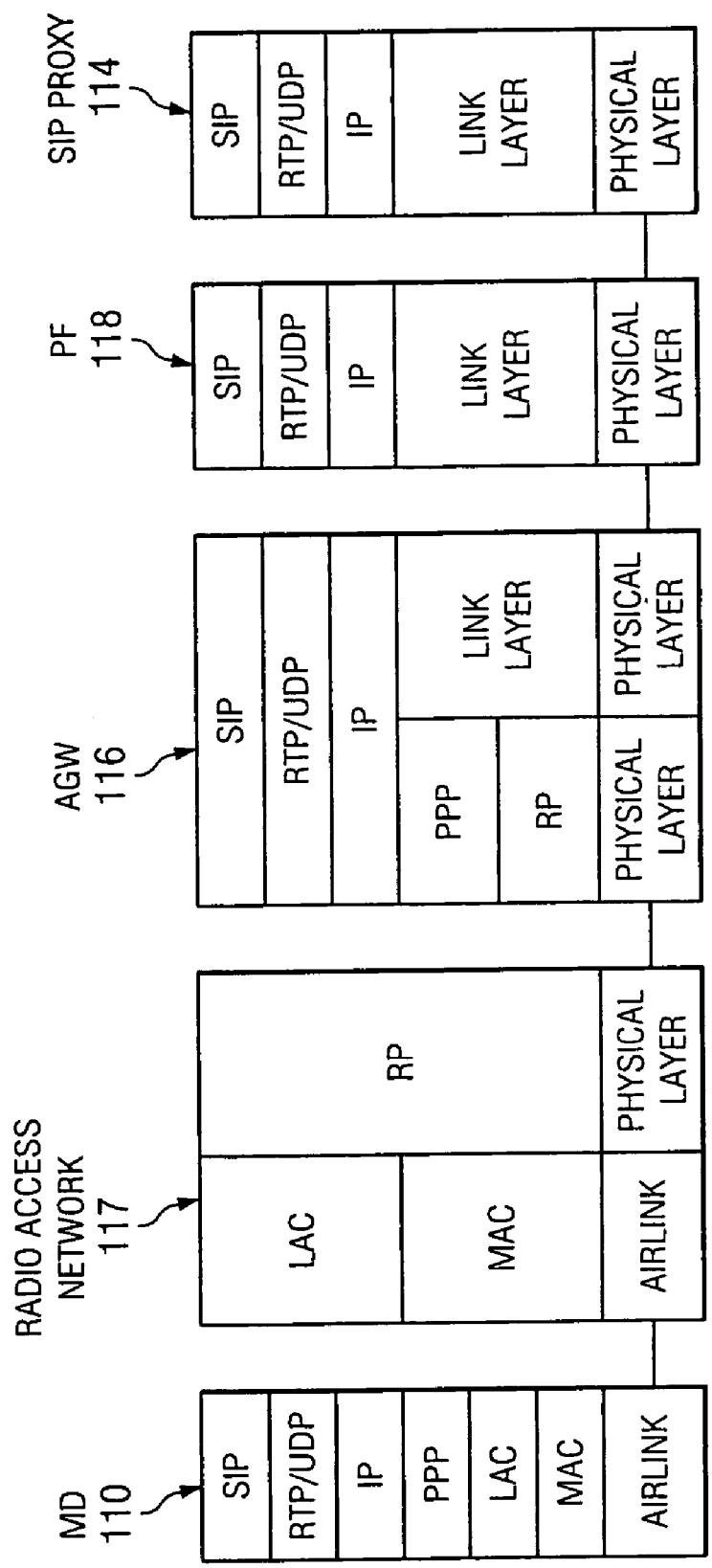
FIG. 4 is a diagram of the protocol stacks of the components of FIG. 2 showing the communications protocols used in the connections illustrated in FIG. 3.

A protocol reference model for a selective handoff consists of diverse radio access networks that are supported by a multimedia enabled core network is shown in FIG. 4. The physical layer and the link layer protocols would be different for different wireless access technologies. For inter-operability, the protocols at the network layer and above are based on open standards. In this model the multimedia call control is performed via SIP, and the media streams are conveyed over real-time protocol (RTP), user datagram protocol (UDP) and Internet protocol (IP).

SIP Proxy 114 supplies the QoS profile to the Policy Function (PF) 118, which provides the QoS profile to AGW 116, where it is enforced in terms of the corresponding bearer level resources. The resource allocation at AGW 116 is enforced in terms of the access segment associated with the access technology supported by AGW 116.

The SIP proxy 114 obtains the QoS profile from the mobile device (MD) 110 using Session Description Protocol (SDP) (see Handley, M. and V. Jacobson, "SDP: Session Description Protocol", RFC2327, April 1998, which is incorporated herein by reference) during the establishment of an SIP session. The SIP Proxy 114 updates the PF 118 with the QoS profile, as necessary. The PF 118 in turn updates the AGW 116, which allocates the required bearer resources to satisfy the QoS constraints demanded by the multimedia service. Bearer resources are the links that carry the media content. This QoS profile provides the parameter constraints such as media type, bandwidth etc. for the session associated with the service. The PF 118 authorizes the AGW 116 to allocate the required resources based on the QoS profile, which was negotiated during the establishment of the session between MD 110 and the SIP proxy 114. AGW 116 allocates the bearer level resources with the QoS guarantees requested by the service launched by MD 110.

One aspect of the present embodiment of the invention provides a procedure to selectively trigger the handoff of a mobile device across access gateways (AGWs) based on capacity and QoS constraints, in addition to the handoff's triggered as a result of mobility of the mobile device 110. The NVSE (Normal Vendor Specific Extension) within the Mobile Internet Protocol v4 (mobile IP) (see 3rd Generation Partnership Project 2 (3GPP2), "All-IP Network Architecture Model for cdma2000 Spread Spectrum Systems", S.R0037-0 v3.0, September 2003, which is incorporated herein by reference) is used to transport the current application specific QoS profile for an existing multimedia session to the MD 110. MD 110 then uses the mobile IP extensions to select a suitable access gateway for the handoff of the mobile device. The selective transfer of the mobility agent function across access gateways provides an enhanced user-experience as well as improved resource utilization in the access network. The use quality of service criteria such as capacity thresholds, at the access gateway, enables the handoff of the mobile device from one of many access gateways for a given serving area for load balancing and fault tolerance.

To enhance the resource utilization in the access network (intra-domain), the MD utilizes the NVSE extension in the mobile IP registration reply from the AGW as a trigger to select an alternate AGW in the same serving area, if AGW 116 detects impending limitations with respect to capacity thresholds or QoS degradation.

To enhance the service experience, MD 110 utilizes the NVSE extension in the mobile IP agent advertisements to probe the QoS profile limits associated with each available access technology interface via the respective AGW of each access technology. This probe operation is performed, on power-up and/or prior to the launch of a multimedia service. The available access technology interfaces are sorted based on signal strengths, nominal bandwidth and nominal QoS capabilities. The sorted list is used to select a suitable access technology interface based on the QoS constraints demanded by a multimedia application, when it is launched. Any changes in access technology resulting from mobility results in anchoring at the source AGW 116 for delay sensitive multimedia services.

The link layer identifiers associated with an AGW are used in the SIP signaling to the SIP proxy entity. The SIP proxy entity utilizes the link-layer identities to set QoS profile limits based on the pre-configured limits for each access technology and the subscription level.

The present embodiment of the invention includes the transfer of the application driven QoS profile to AGW 116 in the access network from the core network 120. The use of QoS constraints to select an access gateway mitigates the impact on user-experience resulting from mobility as well as from the inefficient use of resources in the access network. In this scenario, the SIP Proxy 114 serves multiple PFs. A different PF, within a single administrative domain, serves AGWs associated with different access technologies. An administrative domain is at least one AGW that is administered by a single entity, such as a cellphone provider.

Since the AGW 116 is typically a mobility agent, the AGW 116 has the responsibility to maintain access specific bindings for network mobility support. When the MD 110 attaches to another AGW such as AGW 216 (labeled T for Target AGW), either over the same access technology or a different access technology, an inter-AGW tunnel 210 is established using an available data link to avoid mobile IP registration latencies introduced as a result of a change in the network mobility agent. AGW 216 receives the service session specific QoS parameters via the NVSE extension contained in the signaling between the AGW 116 (labeled S for Source AGW) and AGW 216. AGW 216 forwards the current service specific QoS profile for the existing multimedia session to PF 218 in the target access network.

If the target access network is within the same domain (whether intra-access technology or inter-access technology), the PF 218 already contains the QoS profile limits for a given subscriber. If the target access network is within a different administrative domain (whether intra-access technology or inter-access technology), the PF 218 already contains the QoS profile limits based on inter-domain SLAs (Service Level Agreements). PF 218 authorizes the requested service session specific QoS within the QoS profile limits. In response to the authorization, AGW 216 allocates the required bearer resources.

AGW 116 continues to serve MD 110, until specific triggers to tear down the inter-AGW tunnel 210 are detected. Inter-AGW tunnel 210 is torn down, under the following conditions: 1) Tunnel inactivity timer expiration, and 2) Real time traffic profile is absent. After inter-AGW tunnel 210 is torn down, MD 110 establishes a new mobile IP session with AGW 216, which then becomes the source AGW.

Figure 5:
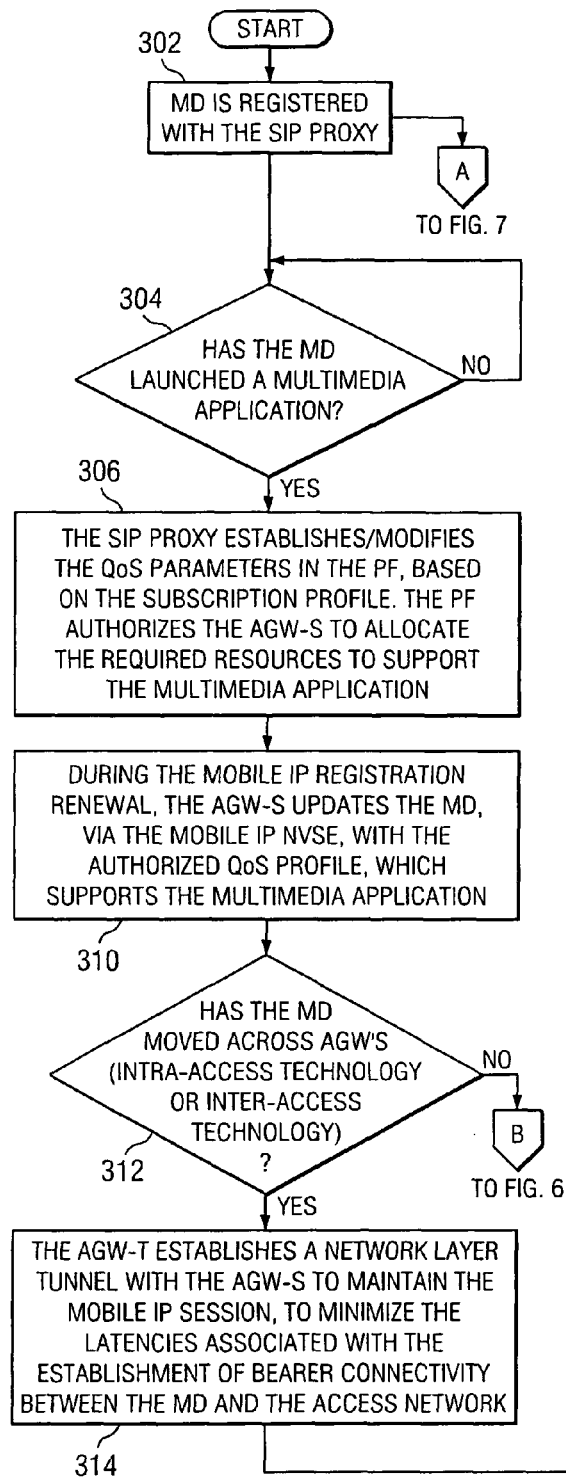
FIG. 5 is a flow diagram of a process that is one embodiment of the present invention.
Figure 5:
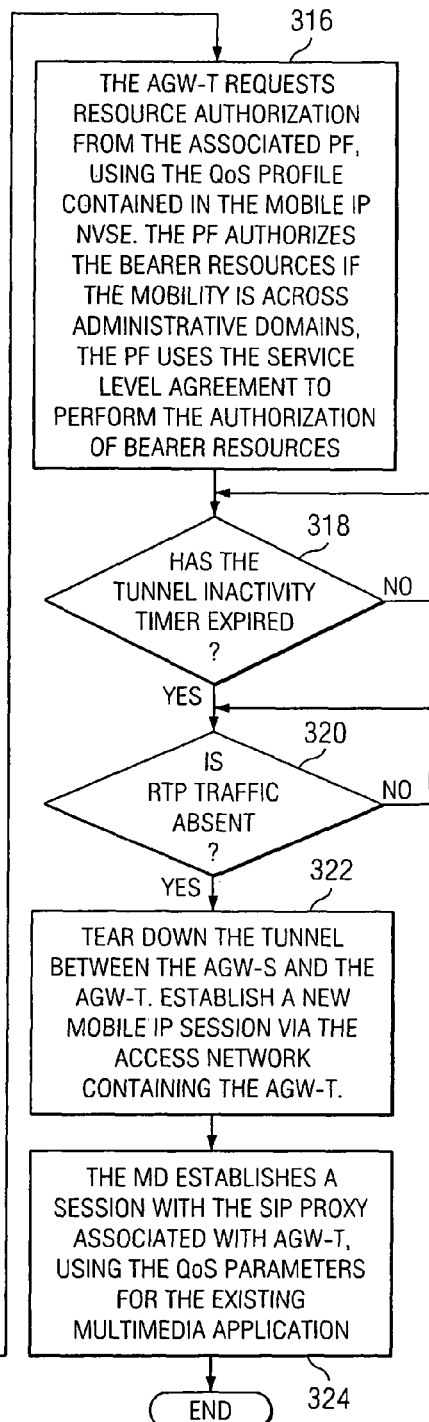

FIG. 5 is shows the steps in transferring the mobile device from one access gateway to another. At step 302, MD 110 registers with SIP proxy 114. At step 304, it is determined if a request for a service requiring a specific QoS profile has been lauched. In this case, the service is a multimedia application. If so, at step 306 the SIP proxy 114 modifies the QoS parameters in PF 118 and the PF 118 authorizes the AGW 116 to allocate the resources necessary for the application launched by MD 110. In step 310, while updating the mobile IP registration, AGW 116 updates MD 110 using the mobile IP NVSE to indicate the resources necessary for the multimedia application. In step 312, it is determined if MD 110 has moved across operational boundaries of the network served by AGW 116. If not, the subprocess shown in FIG. 6 may be executed.

In step 402, MD 110 may detect a proposal for a new AGW within the same access network as a result of activity impacting the QoS capabilities of AGW 116. If so, the state of proposed AGW 216 is refreshed at step 404. In step 406, MD 110 completes registration with AGW 216 and the multimedia application session continues using the new AGW 216 as noted in step 408.

Returning to FIG. 5, at step 314, AGW 216 establishes a tunnel connection to AGW 116 in order to maintain the mobile IP session of MD 110 and minimize latencies in the handover. The establishment of at tunnel between AGWs may also be established in the transition process of FIG. 6. In step 316, AGW 216 requests authorization from the PF 118 to establish bearer resources for the mobile IP session. If the transistion is across domains, the authorization level is determined by the PF in the new domain according to service level agreements. In looped steps 318 and 320, the tunnel 210 activity is monitored to determine if the tunnel continues to be necessary. When both the inactivity timer has expired and no RTP traffic occurs on tunnel 210, the tunnel is torn down at step 322. At step 324, MD 110 establishes an SIP session with SIP proxy 214 to complete the transition.

In a preferred embodiment, steps 302 and 304 are replaced with steps 502, 504, 506 and 508 as shown in FIG. 7. In step 502, MD 110 listens to advertisements of access capabilities of two or more technologies. In step 504, MD 110 sorts the available technologies in terms of QoS capabilities. When the launch of a multimedia application is detected in step 506, MD 100 completes SIP registration with the network segment providing the optimal QoS capabilities.

The described embodiments provide optimal allocation of mobile device quality of service needs while minimizing potential impacts to quality of service and providing transistions between wireless access gateways and technologies that are a seamless as possible. Although specific embodiments are described herein, there are not to be interpretted as limiting the scope of the invention. The scope of the invention is only limited by the claims appended hereto.

We claim:

1. A method for providing access by a user device of a network service comprising:
    sending an initiation signal from the user device to a session initialization proxy server;
    initiating an application on the user device that requires the network service;
    sending quality of service parameters for the user device and the application from the session initialization proxy server to a policy function server;
    sending a resource allocation request from the policy function server to a first access gateway;
    in response to the resource allocation request, providing the network service to the user device in accordance with the quality of service parameters via the first access gateway;
    monitoring, by the user device, the first access gateway to determine if the first access gateway can continue to provide the network service in accordance with the quality of service parameters comprising an indicator of a media type for a session associated with the network service;
    if the first access gateway can no longer provide the network service in accordance with the quality of service parameters, the user device determining a second access gateway that can provide the network service according to the quality of service parameters;
    providing the network service to the user device via a link between the first access gateway and the second access gateway;
    establishing communication between the second access gateway and the user device;
    automatically providing the network service to the user device via the second access gateway when communication between the user device and the second access gateway has been established; and
    closing the link between the first access gateway and the second access gateway.

2. A method for providing access by a user device of a network service as in claim 1 further comprising monitoring available network resources available for the network service and selecting the network on which to establish the network service based on the available network resources.

3. A method for providing access by a user device of a network service as in claim 1 wherein the network service is provided over a wireless network.

4. A method for providing access by a user device of a network service as in claim 1 wherein the first access gateway controls access to a network using a first technology and the second access gateway controls access to a network using a second technology.

5. A method for providing access by a user device of a network service as in claim 4 wherein the first technology is a wireless cellular network and the second technology is WiFi network.

6. A system for providing access by a user of a network service comprising:
    a user device configured to send an initiation signal from the user device to a session initialization proxy server, configured to initiate an application on the user device that requires the network service;
    the session initialization proxy server configured to send quality of service parameters for the user device and the application from the session initialization proxy server to a policy function server;
    the policy function server configured to send a resource allocation request from the policy function server to a first access gateway;
    the first access gateway configured to provide the network service to the user device in accordance with the quality of service parameters via the first access gateway, in response to the resource allocation request;
    the user device configured to determine if the first access gateway can continue to provide the network service in accordance with the quality of service parameters comprising an indicator of a media type for a session associated with the network service, and, if the first access gateway can no longer provide the network service in accordance with the quality of service parameters, the user device determining a second access gateway that can provide the network service according to the quality of service parameters;

the second access gateway configured to provide the network service to the user device via a link between the first access gateway and the second access gateway, configured to establish communication between the second access gateway and the user device, configured to automatically provide the network service to the user device via the second access gateway when communication between the user device and the second access gateway has been established, and configured to close the link between the first access gateway and the second access gateway when provision of the network service by the second access gateway has been established.

7. A system as in claim 6 wherein the user device is further configured to monitor available network resources available for the network service and selecting the network on which to establish the network service based on the available network resources.

8. A system as in claim 6 wherein the network service is provided over a wireless network.

9. A system as in claim 6 wherein the first access gateway is configured to control access to a network using a first technology and the second access gateway is configured to control access to a network using a second technology.

10. A system as in claim 9 wherein the first technology is a wireless cellular network and the second technology is WiFi network.

* * * * *